United States Patent

Kudou et al.

[11] Patent Number: 6,005,785
[45] Date of Patent: Dec. 21, 1999

[54] POWER SUPPLY CIRCUIT

[75] Inventors: Kazuyuki Kudou; Tatsuzou Hasegawa; Haruyuki Inohana, all of Saitama, Japan

[73] Assignee: Pioneer Electronic Corporation, Tokyo, Japan

[21] Appl. No.: 09/065,610

[22] Filed: Apr. 24, 1998

[30] Foreign Application Priority Data

Apr. 26, 1997 [JP] Japan .................................. 9-123534

[51] Int. Cl.⁶ .............................. H02H 3/08; G05F 5/00
[52] U.S. Cl. ................................ 363/50; 323/301; 361/18
[58] Field of Search ...................... 363/50, 51; 323/232, 323/247, 299, 301, 302; 361/18, 78, 87

[56] References Cited

U.S. PATENT DOCUMENTS

| | | | |
|---|---|---|---|
| 4,438,473 | 3/1984 | Cawley et al. | 361/18 |
| 4,731,691 | 3/1988 | Padwa | 361/87 |
| 5,181,155 | 1/1993 | Beg et al. | 361/87 X |

FOREIGN PATENT DOCUMENTS 62-161587  10/1987  Japan ............................ H02M 3/28

*Primary Examiner*—Y. J. Han
*Attorney, Agent, or Firm*—Sughrue, Mion, Zinn, Macpeak & Seas, PLLC

[57] ABSTRACT

A power supply circuit has: a power supply filter including a coil which is inserted in series into an input line; a DC—DC converter which is connected to an output of the power supply filter and which converts an input voltage into an arbitrary output voltage; a detecting section which detects a potential difference between ends of the coil; and a control section which controls the output voltage of the DC—DC converter based on the detected potential difference.

11 Claims, 5 Drawing Sheets

POWER SUPPLY CIRCUIT

BACKGROUND OF THE INVENTION

1. Field of the Invention

The invention relates to a power supply circuit, and particularly to a power supply circuit for an audio apparatus having a switching type DC—DC converter.

2. Description of the Related Art

It is conventionally known that an excess current caused by a short circuit of a load or the like results in damage of an internal component of a DC—DC converter which constitutes a power supply circuit. An example of a configuration for eliminating such a drawback is disclosed in Japanese Utility Model Publication (Kokai) No. SH062-161587.

FIG. 6 shows a DC—DC converter having an overcurrent detecting circuit disclosed in the above-identified publication. Referring to the figure, a DC—DC converter 6 functions as a power supply for driving a load 74.

An overcurrent detecting section comprises a detecting resistor 71, a reference voltage 4, an overcurrent detecting circuit 72, and an operation stop signal generating circuit 73. The overcurrent detecting circuit 72 compares a voltage drop produced by a current flowing through the detecting resistor 71 inserted in series into an input line, with the reference voltage 4. When the voltage drop is larger than the reference voltage 4, it is determined that the circuit is in an overcurrent condition, and a determination signal is sent to the operation stop signal generating circuit 73. In response to the detection signal indicative of the overcurrent condition, the operation stop signal generating circuit 73 supplies an operation stop signal for stopping the operation of the DC—DC converter 6 to the DC—DC converter 6.

Japanese Utility Model Publication No. SH062-161587 also discloses protection processing for an excess current by utilizing a PWM control IC which is generally used for controlling an output voltage of a switching type DC—DC converter.

Specifically, the circuit is protected in the following manner. When an excess current is produced, the ON duty period of a PWM signal is set to be 0, so as to stop the switching operation of the DC—DC converter.

Such a DC—DC converter is widely used in the field of a sound apparatus. In a power supply circuit for an amplifier which is mounted on a vehicle and used for driving a loudspeaker, particularly, a high output cannot be obtained by using a voltage of a battery (a power supply voltage), and hence the power supply voltage is boosted by the DC—DC converter so that the boosted voltage is used as a power supply for the amplifier.

If a loudspeaker having an impedance which is smaller than a loudspeaker impedance range assumed for the amplifier is used, the above-mentioned overcurrent protecting circuit tries to prevent an excess current from flowing through a switching device and a transformer.

In the above-described protecting circuit, since the switching operation of the DC—DC converter is stopped, also the operation of the amplifier is stopped. Accordingly, the loudspeaker is not driven, and a dropout of reproduced sound occurs.

The detecting resistor 71 which constitutes the overcurrent detecting section is inserted in series into the input line dedicated to the detection of an excess current. Accordingly, an electric power loss due to the overcurrent detection is produced.

SUMMARY OF THE INVENTION

The invention has been made to solve the above problem with the prior art, and therefore an object of the invention is to provide a novel power supply circuit provided with an overcurrent protecting circuit for a DC—DC converter.

In order to achieve the above object, the power supply circuit of the invention comprises: a power supply filter including a coil which is inserted in series into an input line; a DC—DC converter which is connected to an output of the power supply filter and which converts an input voltage into an arbitrary output voltage; a detecting section which detects a potential difference between ends of the coil; and a control section which controls the output voltage of the DC—DC converter based on the detected potential difference.

DETAILED DESCRIPTION OF THE PREFERRED EMBODIMENTS

Hereinafter an embodiment of the invention will be described with reference to the drawings.

Figure 1:
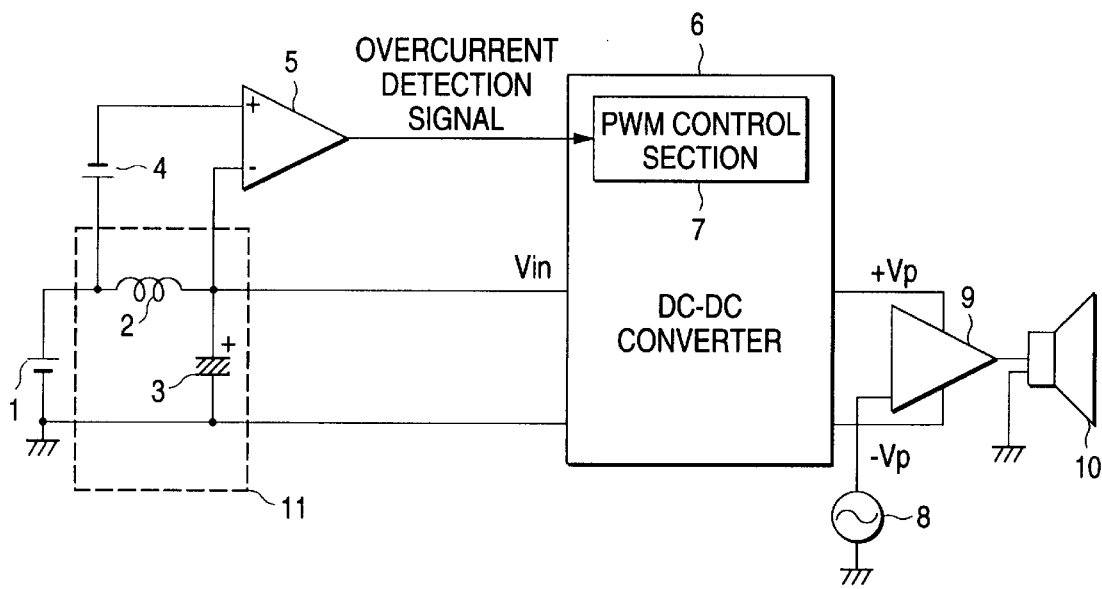
FIG. 1 is a view diagrammatically showing the configuration of an audio system provided with the power supply circuit of the invention.
Figure 6:
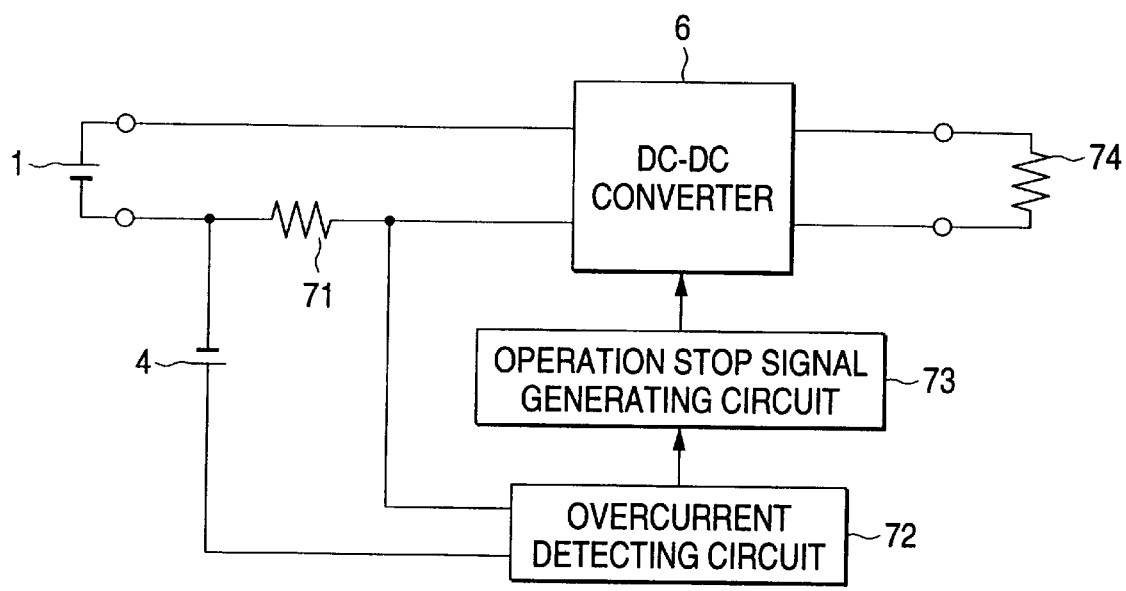
FIG. 6 is a view diagrammatically showing the configuration of a DC—DC converter provided with an overcurrent detecting circuit of the prior art.

FIG. 1 is a view diagrammatically showing the configuration of an audio system provided with the power supply circuit of the invention. Portions which are the same as those in FIG. 6 are designated by the same reference numerals.

In the invention, in order to prevent the overcurrent detection from producing an electric power loss, a power supply filter 11, which is generally used in a sound apparatus, is used also for the overcurrent detection. Specifically, a coil 2 which constitutes the power supply filter 11 is used also as an element for detecting an excess current.

In the audio system of FIG. 1, when a current flows through the input line, a potential difference (a voltage drop) is produced between the ends of the coil 2. Voltages at the ends of the coil 2 are compared with each other in a comparator 5. When a current causing a voltage drop which exceeds the reference voltage 4 flows through the input line, an overcurrent detection signal is output from the comparator 5.

The overcurrent detection signal output from the comparator 5 is supplied to a PWM control section 7 in the DC—DC converter 6.

When an excess current is produced, the PWM control section 7 controls the ON period of a switching device which constitutes the DC—DC converter 6. Specifically, the limitation is applied so that the ON duty period of a PWM signal is reduced.

In accordance with the reduction of the ON period of the switching device, also an output voltage ±Vp of the DC converter 6 is lowered.

The output voltage ±Vp of the DC—DC converter 6 is supplied as a power supply voltage to an amplifier 9. The amplifier 9 amplifies an input AC signal from a signal source 8, so as to drive a loudspeaker 10.

When an excess current is produced, the power supply voltage of the amplifier 9 is limited as described above, so that also a current which flows through the coil 2 is consequently limited.

Figure 2:
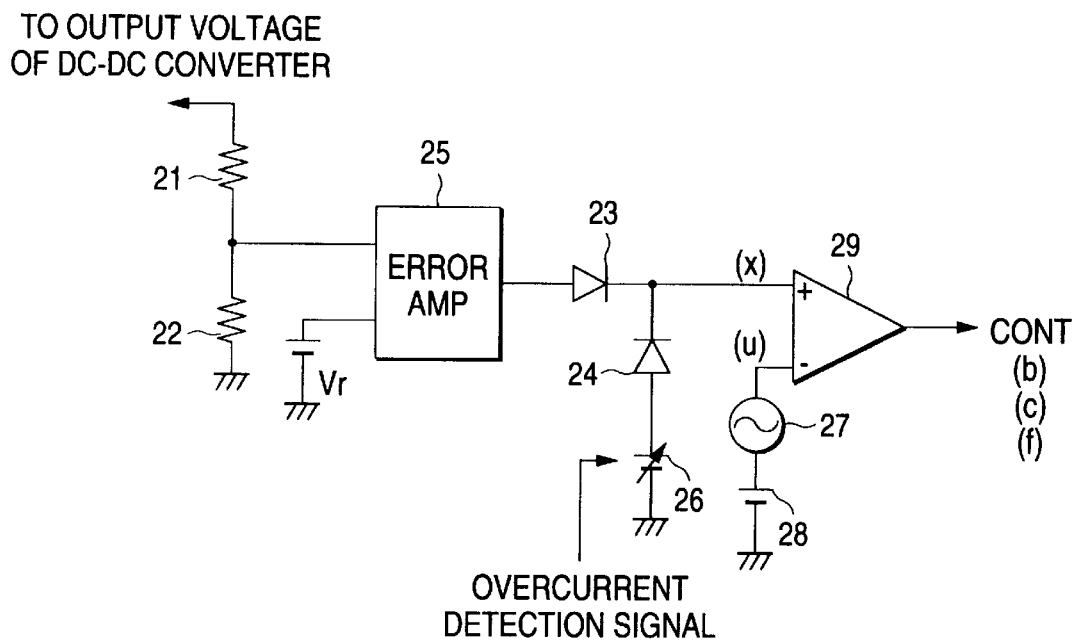
FIG. 2 is a diagram showing the internal configuration of a PWM control section.

FIG. 2 shows an example of the internal configuration of the PWM control section 7.

The PWM control section 7 outputs a control signal (cont) for performing an ON/OFF control of switching devices in the DC—DC converter 6 which will be described later.

A signal which is obtained by attenuating the output voltage ±Vp of the DC—DC converter 6 at a predetermined rate in resistors 21 and 22 is supplied to a comparison input terminal of an error amplifier 25.

The error amplifier 25 compares the output of the DC—DC converter 6 with the reference voltage Vr, and amplifies the error.

An error signal (x) output from the error amplifier 25 is supplied to one of comparison inputs of a comparator 29.

A signal (u) in which a triangular wave 27 is superimposed on a reference voltage 28 is supplied to the other comparison input of the comparator 29.

In accordance with the inputs (x) and (u), the comparator 29 determines the ON duty period of the PWM wave (cont).

Specifically, the comparator 29 outputs a Hi signal of a high level in a period in a condition of the triangular wave (u)>the error signal (x), and outputs a Lo signal of a low level in a period in a condition of the triangular wave (u)<the error signal (x).

Accordingly, the period of the Hi signal corresponds to the ON duty period of the PWM signal.

FIGS. 4A to 4F are waveform charts showing relationships among the inputs of the comparator 29 and the PWM wave outputs.

In the following description, it is assumed that the error amplifier 25 outputs an error signal (x1 to x3) which varies in the upward direction in the figure when the output of the DC—DC converter 6 is larger than the reference voltage Vr, and varies in the downward direction in the figure when the output of the DC—DC converter 6 is smaller than the reference voltage Vr.

Figure 4:
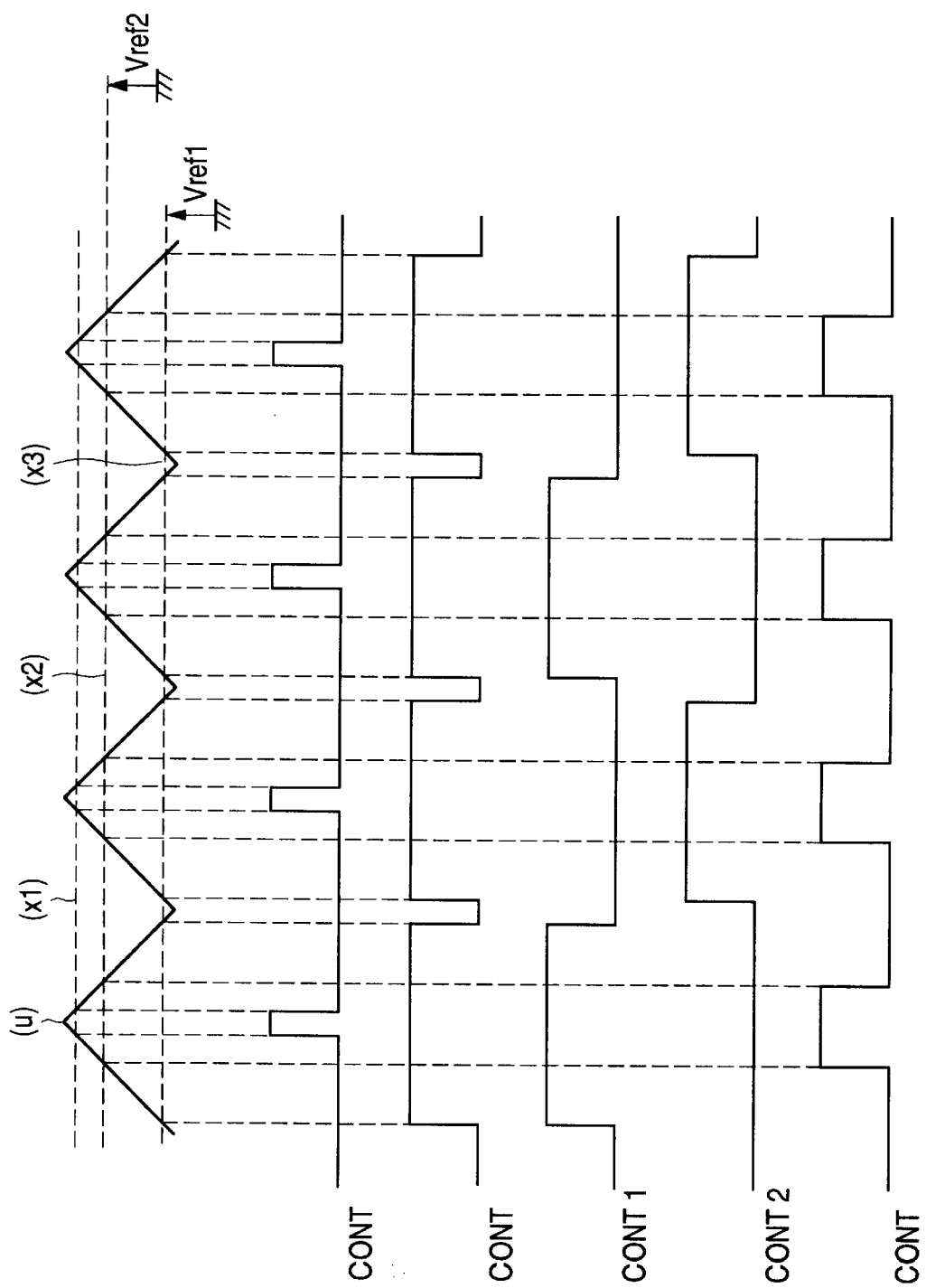
FIGS. 4A to 4F are waveform charts showing relationships among inputs of a comparator and PWM wave outputs.

FIG. 4A shows both the inputs of the comparator 29, i.e., the signal (u) in which the triangular wave 27 is superimposed on the reference signal 28, and the error signal (x).

FIGS. 4B, 4C, and 4F show PWM signals corresponding to the error signals (x1), (x3), and (x2), respectively. As described above, the period of the Hi signal corresponds to the ON duty period of the PWM signal.

In the embodiment, the maximum value of the ON duty period of the settable PWM signal in the condition where an excess current is detected is different from that in the normal condition where no excess current is detected.

For example, the control is performed in the following manner. In the normal condition, the error signal can be set to (x3) at the maximum. In the condition where an excess current is detected, the error-signal can be set only to (x2) at the maximum.

An offset voltage 26 is provided for performing the control.

The error amplifier 25 and the offset voltage 26 are connected to the comparator 29 via diodes 23 and 24, respectively. In the normal condition, the offset voltage is set to Vref1, and the control is performed in such a manner that the error signal is not lower than (x3).

In the condition where an excess current is detected, the offset voltage is set to Vref2, and the control is performed in such a manner that the error signal is not lower than (x2). These controls will be described later.

Figure 3:
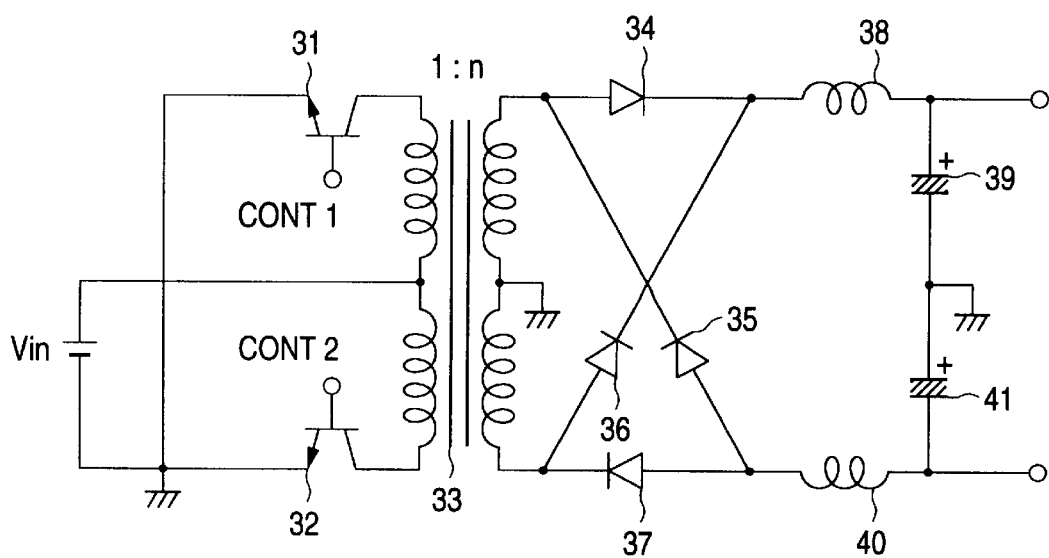
FIG. 3 is a diagram showing an example of a switching type DC—DC converter.

FIG. 3 shows an example of the switching type DC—DC converter 6 which is controlled by a PWM signal.

The DC—DC converter 6 comprises switching devices 31 and 32, a potential transformer 33, diodes 34, 35, 36, and 37 which operate as a rectifying section, coils 38 and 40, and capacitors 39 and 41.

The operation of the DC—DC converter 6 is described below. By the switching operation of the switching devices 31 and 32, a DC voltage Vin is once inverted into an AC voltage. Voltage transformation is performed by the high-frequency transformer 33. Then, the voltage is rectified in the rectifying section, so as to obtain a desired DC voltage.

The case of the error signal (x3) is exemplarily described. First, a PWM signal shown in FIG. 4C is output from the comparator 29. The PWM signal is distributed into switching signals cont1 and cont2 shown in FIGS. 4D and 4E. The switching signal cont1 is supplied to the switching device 31, and the switching signal cont2 to the switching device 32.

Accordingly, the switching devices 31 and 32 alternately perform the switching operation in accordance with the switching signals cont1 and cont2.

In general, in the illustrated DC—DC converter 6, the duty ratio of each of the switching signals cont1 and cont2 is set so as not to exceed 50%, in order that the ON states of the switching devices 31 and 32 do not simultaneously exist.

For this purpose, in the normal condition, the offset voltage 26 is set to, for example, Vref1 so that the error signal is not lower than (x3).

In the case where a load (a loudspeaker) having a low impedance which is not in the range assumed for the amplifier is connected, an overcurrent condition is caused by the maximum ON duty period defined by the offset voltage of Vref1.

According to the invention, therefore, the offset voltage 26 is changed to Vref2 in response to the overcurrent detection signal. As a result, the maximum ON duty period which can be set is a value corresponding to the offset voltage of Vref2.

In the overcurrent condition, consequently, the ON periods of the switching devices 31 and 32 can be forcefully shortened, so that the output voltage Vp of the DC—DC converter 6 can be lowered by a predetermined amount.

Figure 5:
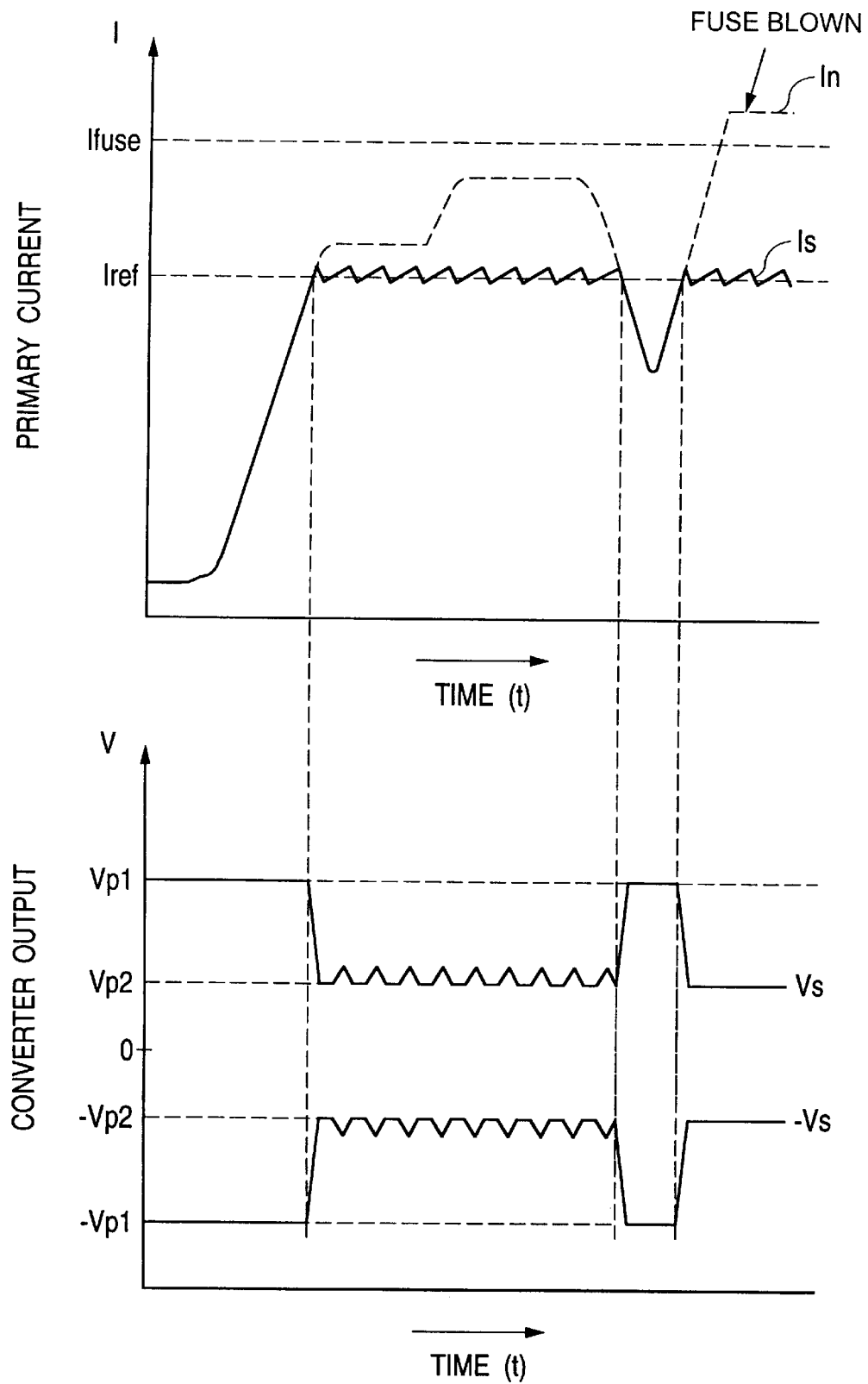
FIG. 5 is a waveform chart showing a current waveform in the case where a DC—DC converter having no overcurrent detecting device is used, and current and voltage waveforms in the case where a DC—DC converter having an overcurrent detecting device of the invention is used.

FIG. 5 shows the manner of this change. In FIG. 5, the waveform In indicated by a broken line is a current waveform in the case where a DC—DC converter 6 having no overcurrent detecting device is used, and the waveforms Is and Vs indicated by solid lines are current and voltage waveforms in the case where the DC—DC converter 6 having the overcurrent detecting device of the invention is used.

According to the invention, in a period when a current flowing through the primary side of the transformer 33 exceeds a reference value Iref, the output voltage of the DC—DC converter 6 is forcefully lowered from Vp1 to Vp2. As a result, the current flowing through the primary side of the transformer 33 is limited as shown in the figure.

In other words, condition transition in the sequence of detection of an overcurrent condition in the primary side, limitation of the ON duty period, reduction of the secondary voltage (decrease of the primary current), detection of elimination of the overcurrent condition in the primary side, cancellation of the limitation of the ON duty period, increase of the secondary voltage (increase of the primary current), and detection of an overcurrent condition in the primary side is repeated.

By contrast, when the DC—DC converter 6 having no overcurrent detecting device is used, the current flowing through the primary side of the transformer 33 reaches a value Ifuse at which a fuse is blown. After the fuse is blown, any sound cannot be output until the fuse is exchanged with another one.

According to the invention, only the power supply voltage of the amplifier is lowered by a predetermined amount. Thus, it is always possible to continuously output the sound from the loudspeaker 10, and the dropout of sound which intermittently occurs in the prior art cannot occur.

As described above, according to the invention, the ON duty period of the PWM wave generated in the PWM signal generating circuit is controlled in accordance with the level of a current flowing through the coil for the power supply filter. Thus, it is possible to effectively suppress the flow of an excess current which may destroy internal devices to the DC—DC converter.

In the invention, particularly, the coil constituting the power supply filter is utilized, and hence it is unnecessary to dispose any additional resistor dedicated for the overcurrent detection. Therefore, the invention is advantageous in the view points of the number of used components and the power loss.

What is claimed is:

1. A power supply circuit comprising:
    a power supply filter including a coil which is inserted in series into an input line;
    a DC—DC converter which is connected to an output of said power supply filter and which converts an input voltage into an adjustable output voltage;
    a detecting section which detects a potential difference between ends of said coil; and
    a control section which varies said adjustable output voltage of said DC—DC converter based on the detected potential difference, wherein said adjustable output voltage is reduced but not interrupted upon detection by said detecting section, of an over-current situation.

2. A power supply circuit according to claim 1, wherein said DC—DC converter includes a switching device in which said adjustable output voltage is determined in accordance with an ON duty width, and said control section changes the ON duty width of said switching device based on the detected potential difference.

3. A power supply circuit according to claim 1, wherein said control section comprises a pulse width modulation (PWM) unit.

4. A power supply circuit according to claim 1, wherein said DC—DC converter is a switching type DC—DC converter comprising a transformer.

5. A power supply circuit according to claim 1, wherein said detecting section comprises a comparator.

6. A power supply circuit with over-current detection circuitry and output control circuitry comprising:
    an input filter comprising an inductor connected in series with an input line;
    a detection unit which detects a voltage drop across said inductor wherein said detection unit detects an over-current situation;
    a DC—DC converter, connected to an output of said input filter, for converting an input voltage into an adjustable output voltage; and
    a control unit connected to said DC—DC converter for adjusting said adjustable output voltage from a normal output voltage to at least one reduced output voltage during said over-current situation based on a value of said voltage drop detected across said inductor, wherein said at least one reduced output voltage is great enough to supply reduced operating power to a load, wherein said at least one reduced output voltage is lower than said normal output voltage.

7. A power supply circuit according to claim 6, wherein said control section comprises a pulse width modulation (PWM) unit.

8. A power supply circuit according to claim 6, wherein said DC—DC converter is a switching type DC—DC converter comprising a transformer.

9. A power supply circuit according to claim 6, wherein said detecting section comprises a comparator.

10. A method for detecting and resolving an over-current situation in a power supply circuit, comprising the steps of:
    measuring a voltage drop across a coil, wherein said coil is connected in series with an input voltage line;
    controlling an adjustable output voltage of a DC—DC converter based on a value of said voltage drop;
    outputting a normal output voltage as said adjustable output voltage when said over-current situation is not present;
    outputting a reduced output voltage as said adjustable output voltage when said over-current situation is detected;
    supplying a load, connected to said DC—DC converter, with said adjustable output voltage, wherein said load is driven in a normal power state when said adjustable output voltage equals said normal output voltage, and wherein said load is driven in a limited power state when said adjustable output voltage equals said reduced output voltage.

11. A method for detecting and resolving an over-current situation in a power supply circuit as claimed in claim 10, wherein said DC—DC converter is a switching type DC—DC converter comprising a transformer, and wherein said controlling step further comprises the steps of:
    adjusting a width of a pulse in a pulse width modulation (PWM) signal based on said voltage drop across a coil;
    supplying said PWM signal to switching devices of said switching type DC—DC converter for producing a primary side voltage which is transformed into said adjustable output voltage in said switching type DC—DC converter.

* * * * *